United States Patent [19]

Schollmeier

[11] 3,895,298

[45] July 15, 1975

[54] METHOD AND APPARATUS FOR TRANSMITTING AMPLITUDE MODULATED SIGNALS

[75] Inventor: Gero Schollmeier, Gauting, Germany

[73] Assignee: Siemens Aktiengesellschaft, Berlin & Munich, Germany

[22] Filed: Aug. 27, 1973

[21] Appl. No.: 391,805

[30] Foreign Application Priority Data

Sept. 26, 1972 Germany ............ 2247190

[52] U.S. Cl. ............ 325/49; 325/63

[51] Int. Cl. ............ H04b 1/62

[58] Field of Search ............ 179/15 BY; 325/17, 25, 325/42, 49, 65, 50, 63, 67, 418–423

[56] References Cited

UNITED STATES PATENTS

| | | | |
|---|---|---|---|
| 1,844,973 | 2/1932 | Ports | 325/49 |
| 3,196,352 | 7/1965 | Hopner et al. | 325/63 |
| 3,581,207 | 5/1971 | Chang | 325/42 |
| 3,617,635 | 11/1971 | Hirsch et al. | 325/65 |
| 3,679,977 | 7/1972 | Howson | 325/42 |
| 3,715,666 | 2/1973 | Mueller et al. | 325/65 |

*Primary Examiner*—Benedict V. Safourek

[57] ABSTRACT

Method and apparatus for transmitting information by means of an amplitude modulated carrier signal wherein the received signals and a carrier generated at the receiver are coupled to a demodulator. A test signal is generated having two equal valued amplitude extremes, and the test signal pulses are spaced in time at sufficiently great intervals that they cause no mutual interference. The test signals are applied to the modulator and transmitter when the latter are carrying no other signals. At the receiver, the test signal is demodulated, and a control signal is derived from the amplitude extremes of the demodulated test signal.

This control signal changes the phase of the carrier generated at the receiver when the values of the amplitude extremes are dissimilar.

17 Claims, 8 Drawing Figures

METHOD AND APPARATUS FOR TRANSMITTING AMPLITUDE MODULATED SIGNALS

BACKGROUND OF THE INVENTION

The invention relates to a method and apparatus for communicating amplitude modulated signals, wherein the received signals and a carrier produced at the receiver are coupled to a demodulator which demodulates the received signals. The signals comprise generally a mixture of sinx/x shaped pulses or a mixture of partial-response pulses of class IV. The transmissions also take the form of single-sideband signals with a partially or wholly suppressed carrier.

According to a prior art method a pilot signal is continuously transmitted with the message, by means of which the phase of the carrier is adjusted at the receiver. However, this old method does not enable an exact phase adjustment of the carrier, because the phase shift of the message caused by the transmission path is different from the phase shift of the pilot signal.

It is known that the greater the number bits per second which must be transmitted over narrow-band transmission channels, the more difficult it is to adjust the phase of the carrier sufficiently accurately at the receiver.

It is, therefore, an object of the invention to provide a means and method for adjusting the carrier phase at the receiver, by which the carrier phase can be adjusted with greater accuracy than with prior art techniques.

More particularly, it is an object of the invention to provide a means and method for adjusting the carrier phase which can be employed not only by systems having transmission channels for relatively broad frequency bands, but also by transmission channels for narrow frequency bands, for example, by means of telephone lines for the transmission of the voice frequency band.

SUMMARY OF THE INVENTION:

In accordance with the invention, the foregoing and other objects are achieved in that a test signal is generated having two identically valued amplitude extremes spaced in time and which in the period when no signals are carried is transmitted to the demodulator by means of the modulator and the transmitter. Moreover, in dependence upon the amplitude extremes of the demodulated test signal a control signal is derived which causes the phase of the carrier generated at the receiver to be altered when the values of the amplitude extremes are equal. No such alternation occurs in the case of equality between amplitude extremes.

The method according to the invention is characterized by the fact that accurate adjustment of the carrier phase is possible during the breaks in the transmission of information with comparatively little expenditure. This result can be obtained even though a telephone circuit is used as a transmission channel over which voice frequency pulses are carried.

If the message to be transmitted by means of the signals is produced by means of a mixture of band-limited pulses which can be represented as odd time functions, it is generally convenient to use a sequence of pulses as a test signal which can likewise be represented as odd time functions.

If the message to be transmitted by means of the signals is produced from a mixture of band-limited pulses which can be represented as even time functions, it is generally convenient to use as a test signal a sequence of pulses which can likewise be represented as even time functions. In this case, the phase of the carrier produced at the receiving end is shifted 90° upon obtaining the control signal and, after the carrier phase has been adjusted, the phase of the carrier is reset 90°.

The period during which the test signal is sent from the transmitter to the demodulator can be adjusted manually so that little expenditure is required for this purpose.

If the period during which the test signal is transmitted from the transmitter to the demodulator shall be fixed accurately, it is convenient to terminate the transmission of the test signal automatically by means of a delay element.

It is also convenient, whenever so signals are transmitted to transmit the test signal automatically to the demodulator in order to reduce the need for operating personnal. The transmission of this test signal can be terminated either automatically after a predetermined time or during the time that no signals are carried.

According to a further development of the invention it would also be possible to measure continuously the phase errors of the carrier generated at the receiver and to derive a test value. A test signal can be transmitted as a function of this test value whenever the phase error exceeds a preassigned value.

If a step-by-step adjustment of the carrier phase is desired, a control signal can be derived that can assume two binary values, which are dependent on the algebraic sign of the difference between the amplitude extremes of the demodulated test signal. In dependence upon the binary values the phase of the carrier produced at the receiver is then adjusted positively or negatively. The control signal can their be generated by comparing the amplitude extremes of the demodulated test signal. However, the demodulated test signal can also be rectified, and the control signal can be obtained by comparing the amplitude extremes of the rectified test signal.

If the fastest possible adjustment of the carrier phase is desired, it is convenient to generate a control signal that can assume several values which are dependent upon the difference of the amplitude extremes of the demodulated test signal. In this case, the phase of the carrier generated at the receiver is varied as a function of the particular value of the control signal.

If the control signal is to assume several digital values which are dependent upon the difference between the amplitude extremes of the demodulated test signal, it is convenient to couple a signal value corresponding to the difference as an address in the form of a digital number to a read-only storage and to then take the digital control signal from the read-only storage.

In a preferred embodiment of the invention a control signal that can assume several digital values is derived by approximating the dependence of the carrier phase error on the difference of the amplitude extremes by means of a function generator. In the process, counter pulses are routed to the function generator, and a dependence upon the counter indication a signal corresponding to the difference between the amplitude extremes is delivered. Subsequently, the signal delivered by the function generator is compared with the difference and in case of similarity a trigger signal is provided. Moreover, the computer pulses are routed to a digital counter which increases its indication constantly until the trigger signal is received. Upon reception of the trigger signal, the counter indication is made available as a control signal, and the digital counter is reset to an initial indication.

If a rapid and selective adjustment of the carrier phase is desired with comparatively little expenditure, it is convenient to undertake, as a first step, a course adjustment of the phase of the carrier and, subsequently, a fine adjustment. It is possible to determine the quadrant of the carrier phase error by means of a logic circuit and during the course adjustment to adjust the phase of the carrier such that the carrier phase error amounts less than 90°. Subsequently, during the find adjustment the phase of the carrier is adjusted such that the carrier phase error disappears to a large extent.

BRIEF DESCRIPTION OF THE DRAWINGS:

The principles of the invention will be more readily understood by reference to the description of a preferred embodiment given hereinbelow in conjunction with the accompanying eight figures of drawings, wherein like signs denote like components and signals.

Figure 1:
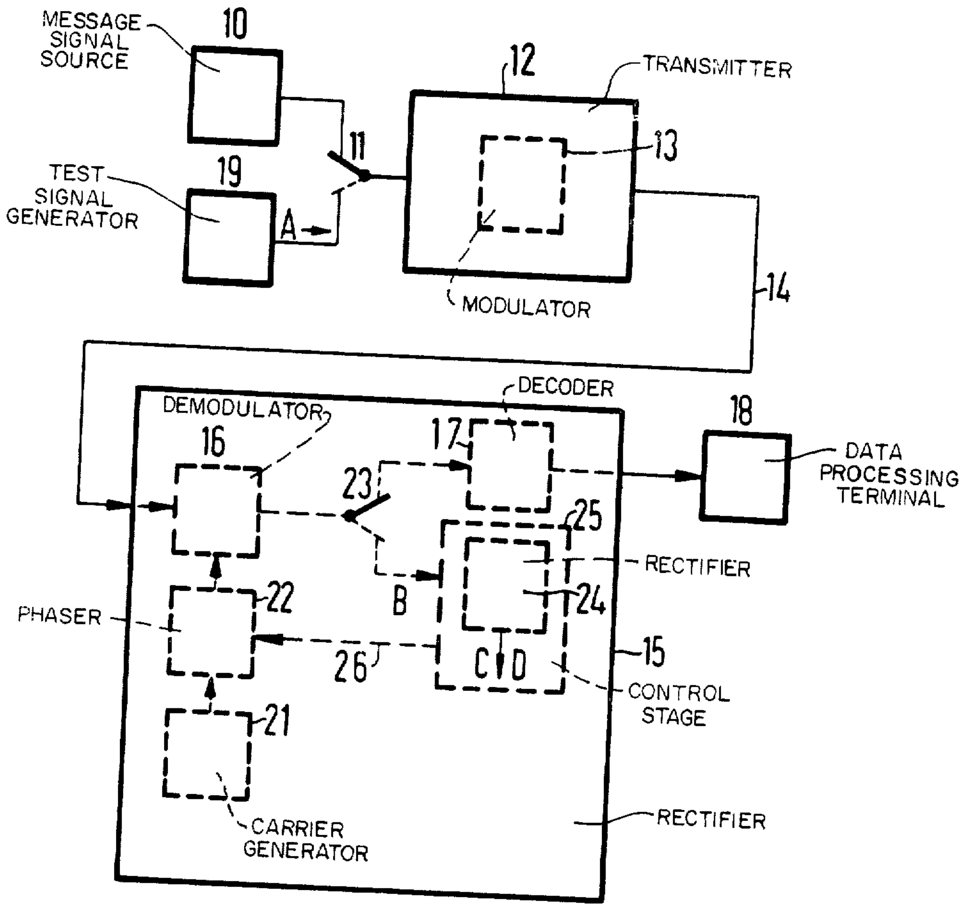
FIG. 1 is a schematic diagram of a data transmission system in which the invention can be applied.

DETAILED DESCRIPTION OF THE DRAWINGS:

FIG. 1 shows a signal source 10 that generates a signal representing the message to be transmitted. This signal may be a mixture of band-limited pulses. For example, the mixture may consist of sinx/x-shaped pulses or of partial-response pulses of class IV. The signal generated by the signal source 10 is routed over a switch 11 to a transmitter 12 having a modulator 13. The modulator 13 modulates the amplitude of a carrier as a function of the amplitude of the message signal.

The signal so generated is transmitted by the transmitter 12 over communication path 14. The transmission may, for example, take place according to a single-sideband technique with wholly or partially suppressed carriers. However, other forms of transmission may be used. A radio link or a telephone circuit may be provided as the communication path 14 which enables the signal to be carried in the 300 to 3400 Hz. voice frequency band.

The signal carried over the communication path 14 is received by a receiver 15, and by means of a demodulator 16 and a decoder 17, a signal is obtained which largely resembles the signal generated by the signal source 10. The demodulated and decoded signal is routed to, for example, a data processing terminal equipment 18 over the output of the receiver 15. A teletypewriter may, for example, be provided as a data processing terminal equipment 18. In the receiver 15, the phase of the carrier is retrieved with a view to controlling the demodulator 16 therewith.

Figure 2:
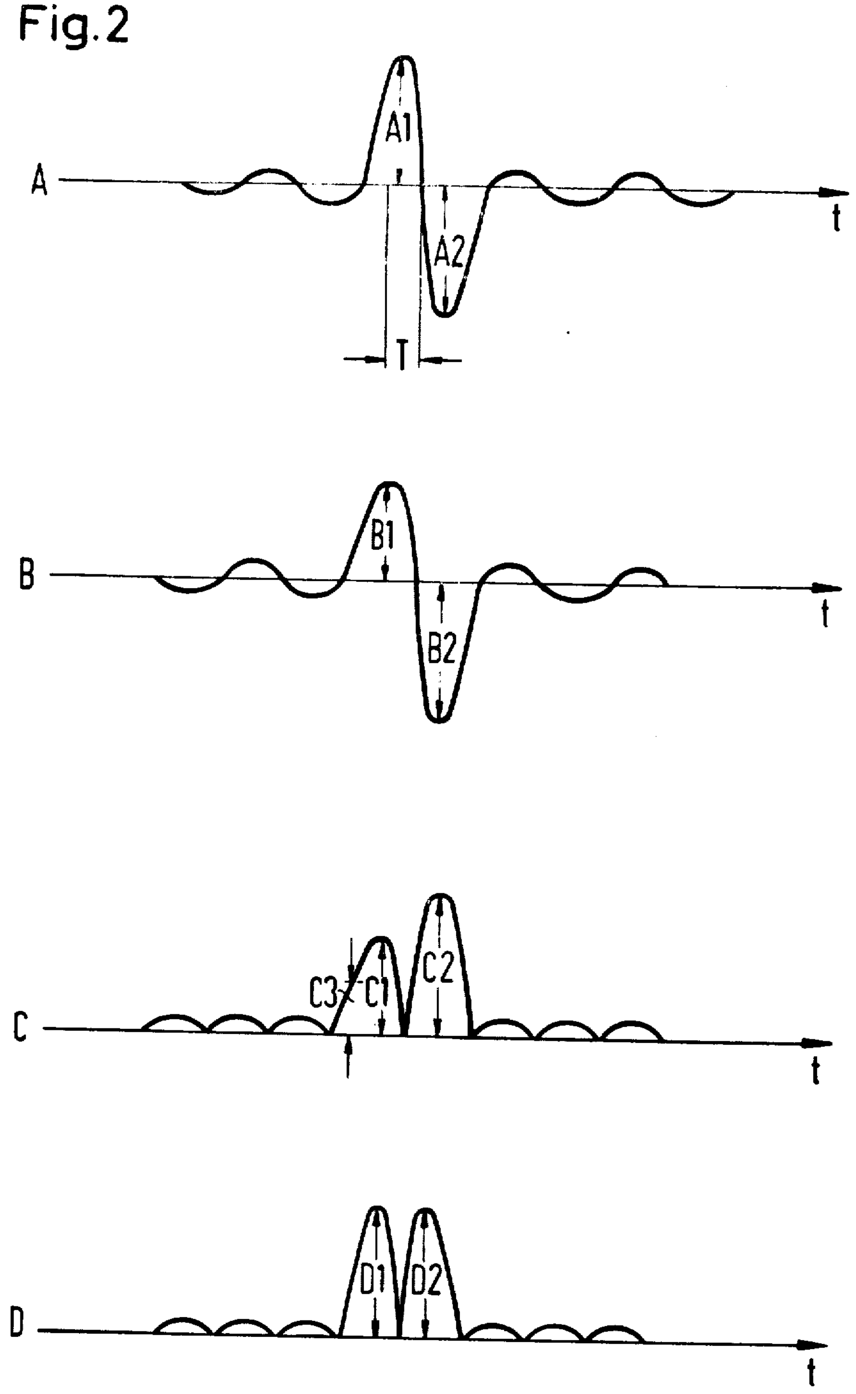
FIG. 2 is a waveform diagram illustrating signals which appear in the system according to FIG. 1.

The signals illustrated in FIG. 2 serve to explain the mode of operation of the arrangement shown in FIG. 1. Parallel to the $x$-axis are plotted the units of time $t$, and parallel to the $y$-axis the units of the amplitude are plotted. A test signal is produced in generator 19 (FIG. 1) and routed to the transmitter 12 in the operating position of the switch 11 indicated by a dashed line. Thus test signal comprises a sequence of pulses, which may be even or odd time functions. If data are emitted from the signal source 10 in FIG. 1 by means of band-limited pulses which can be represented as even or odd time functions, it is generally convenient to also select even or odd time functions as pulses of the test signal.

A test signal is employed, in the form of construction under consideration, having pulses A which are odd time functions. The pulses A are partialresponse pulses of class IV which assume identically valued amplitude extremes A1 and A2 and are spaced in time such that they succeed one another at intervals sufficiently great so as not to cause mutual interference. Perhaps, ten to one hundred such pulses A are required for the purpose of adjusting the carrier phase. In the modulator 13, the carrier is amplitude-modulated as a function of the test signal A, and a corresponding signal is transmitted over the path 14 to the demodulator 16. In the case of a carrier phase error other than zero there appears at the demodulator 16 a linear combination of the pulses A and the pulses Hilbert-transformed thereto.

In the generator 21, (FIG. 1) a carrier is produced and routed to the demodulator 16 over phasing apparatus 22. The signal B is supplied from the output of the demodulator 16 and routed to the rectifier 24 of the control stage 25 over the switch 23 in the operating position indicated by a dashed line.

It is assumed that the phase of the carrier produced in the generator 21 is burdened with a certain phase error so that the equally large extremes A1 and A2 cause unequal extremes B1 and B2 of the signal B, provided from the output of the demodulator 16. Signal B is corrected in rectifier 24, thereby generating a signal C having extremes C1 and C2, which are likewise unequal.

In the control stage 25, the extremes C1 and C2 of the signal C are measured and a control signal is provided over line 26 which causes the phase of the carrier to be shifted by means of the phasing equipment 22. In the correctly adjusted condition, the extremes B1 and B2 or C1 and C2 are equal, so that the signal D is supplied over the output of the rectifier 24.

The switches 11 and 23 are constructed as conventional electronic switches. When the switches 11 and 23 take their full line operating positions, the signal from signal source 10 is carried as a message to the data processing terminal equipment 18. In the process, the phase of the carrier produced in the generator 21 can be readjusted in a manner in itself known. The question as to whether and with what amount of circuitry such a readjustment is needed must be investigated in each particular case and will not be discussed herein. However, if such readjustment of the phase of the carrier produced in the generator 21 is effected in the period when the switches 11 and 23 take the full line operating positions, the expenditure required for circuitry can be kept comparatively low, because in the dashed-line position taken by the switches 11 and 23 a phase adjustment is effected by means of the generator 19 and the control stage 25.

Approximately 1/10 second is needed to adjust the phase of the carrier at the receiver. The switches 11 and 23 can thus be placed manually first to the dashed-line position indicated and subsequently to the full line position, because in so doing the dashed-line position is taken assuredly at least 1/10 second.

It would also be possible to adjust manually the dashed-line operating positions of the switches 11 and 23 and bring about after 1/10 second the automatic changeover of the switches 11 and 23 to their full line operating positions by means of a timing element.

A further possibility of operating the switches 11 and 23 is afforded by automatically changing over the switches 11 and 23 to their dashed-line positions whenever no signal is supplied to the transmitter 12 from the signal source 10 and resetting the switches to their full line operating positions if a signal is supplied from the signal source 10.

Another possibility is afforded for operating the switches 11 and 23 by constantly measuring the carrier phase error in the area of the receiver 15, and as soon as the carrier phase error exceeds a predetermined threshold value, the switches 11 and 23 are brought, for a short time, to their dashedline positions. Thereafter, they are automatically brought to their full line operating positions. These automatic adjustments of the carrier phase may be effected as a function of a predetermined value of the carrier phase error and as a function of the transmitting sequence of the signals received from the signal source 10. For example, it would be possible to adjust automatically the phase of the carrier generated at the receiver during the breaks in the transmission of information initiated by the signal source 10.

If even time functions are selected as pulses of the test signal, the transmitted test signal in the demodulator 16 is demodulated with a carrier whose phase has been shifted 90°. In this way, in the demodulated test signal two extremes B1 and B2 are developed, as illustrated in FIG. 2B, by means of which a control signal can be derived with a view to adjusting the phase of the carrier. After adjusting the phase, the phase of the carrier must subsequently be shifted back by 90°.

Figure 3:
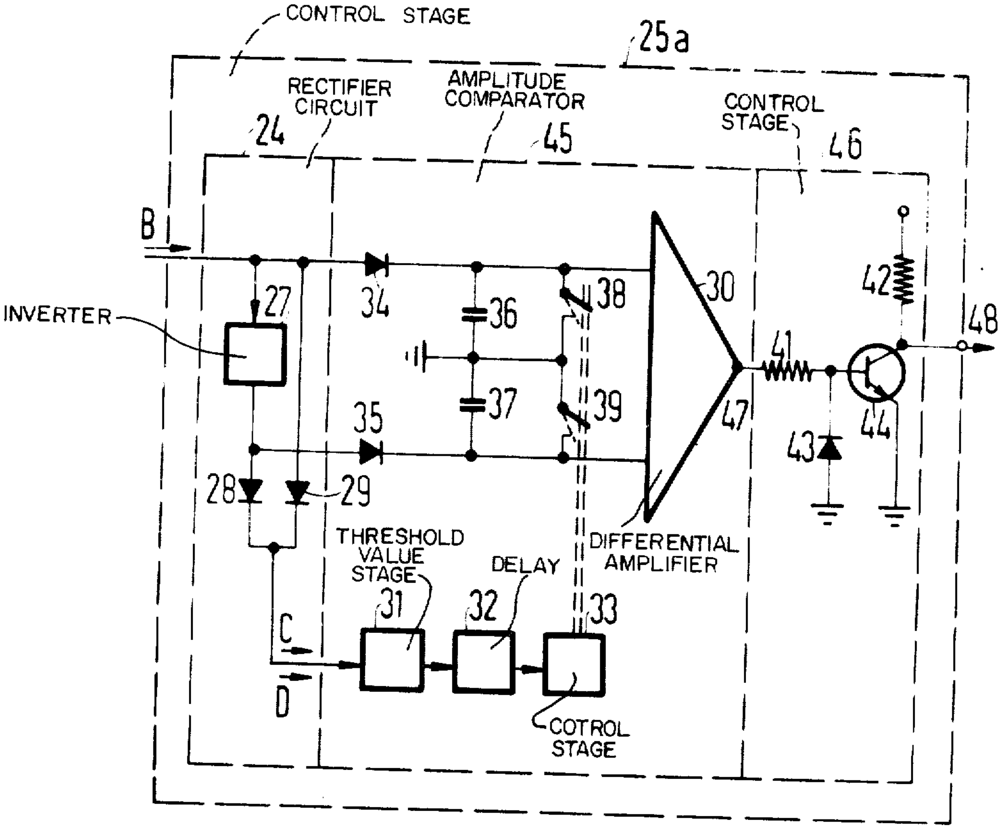
FIG. 3 is a schematic diagram of a preferred embodiment of a circuit arrangement according to the invention comprising a rectifier and a control stage for obtaining a control signal that can assume two values which are dependent upon the algebraic sign of the difference of the amplitude extremes.

FIG. 3 provides a more detailed illustration of a first preferred embodiment of a control stage 25a as an embodiment of the control stage 25 shown in FIG. 1. A control signal is derived by means of control stage 25*a* which can assume two values that are dependent upon the algebraic sign of the difference between the amplitude extremes of the demodulated test signal.

Control stage 25a comprises a rectifier 24, amplitude comparator 45, and control stage 46. The rectifier 24 is designed as a twin-path rectifier circuit and comprises an analog inverter 27 and two diodes 28 and 29. The amplitude comparator 45 comprises a threshold value stage 31, delay element 32, control stage 33, diodes 34 and 35, capacitors 36 and 37, switches 38 and 39 and a conventional differential amplifier 30. The control stage 46 comprises the resistors 41 and 42, diode 43 and transistor 44.

Signal B is coupled to capacitor 36 over diode 34, thereby charging capacitor 36 to a voltage which is proportional to the amplitude B1 (FIG. 2). The signal having an opposite algebraic sign to the signal B is supplied from the output of the analog inverter 27. This inverse signal is routed to the capacitor 37 over the diode 35, and capacitor 37 is charged in this manner to a voltage proportional to the amplitude B2.

In the differential amplifier 30 the difference between the voltages applied to the capacitors 36 and 37 is determined, and an analog signal is supplied over the switching point 47 having an amplitude which is proportional to the difference between the amplitude extremes B1 and B2.

In control circuit 46 only the algebraic sign of the signal supplied over terminal 47 is evaluated, and a signal is provided over terminal 48 whenever the extreme value B1 is greater than the extreme value B2. In the process, the transistor 44 is operated as a switch and the base thereof is accessed over the resistor 41 and terminal 47.

Signal C is coupled to the threshold stage 31 over the outputs of the diodes 28 and 29, which threshold stage operates in the known manner to supply a signal if the amplitude of the signal exceeds a predetermined threshold value C3. The output of the threshold value stage 31 is connected to the delay element 32, which brings about a delay of the signal it receives. The delay is determined such that a signal is not supplied from the output of the delay element 32 until the two extreme values B1 and B2 of the signal B have assuredly decayed. This delay may, for example, equal twice or three times the amount of the period T shown in FIG. 2 in the case of the signal A.

Control stage 33 governs the switches 38 and 39 which are preferably electronic switches and causes these switches to take the dashed-line positions whenever a pulse is routed to the control stage 33 from the timing element 32. Normally, the threshold value C3 is measured, and if both extreme values C1 and C2 have decayed and the corresponding values have been processed by means of the differential amplifier 30, the switches 38 and 39 are brought to the dashed-line operating positions, thereby charging the capacitors 36 and 37. The capacitors 36 and 37 are thereby connected for charging to the values C1 or C2 of the next signal C after the transmission of the next signal A.

In the adjusted condition of the phase signal D is routed to the threshold value stage 31 and positive and negative differentials occurring alternately in the differential amplifier 30, between the extreme values D1 and D2 (FIG. 2), are determined. The terminal 48 can thus be connected to the line 26 over which in the adjusted condition a control signal is supplied for adjusting the phase of the carrier by one unit alternately in one direction or in the opposite direction.

If a particularly rapid and selective adjustment of the carrier phase is desired, it is convenient first to effect a coarse adjustment of the carrier phase and, subsequently, a fine adjustment. To be able to effect the coarse adjustment, the value of the carrier phase error must be determined.

Figure 4:
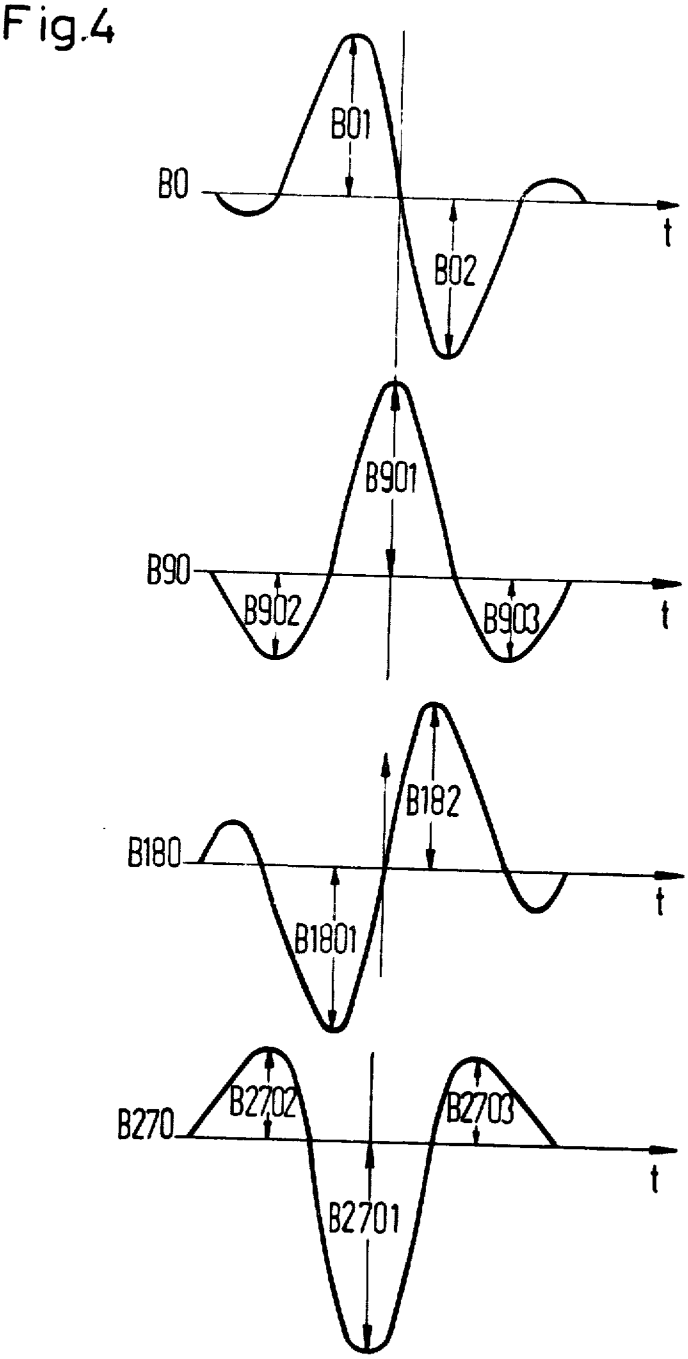
FIG. 4 is a waveform diagram illustrating demodulated test signals in the case of various carrier phase errors.
Figure 5:
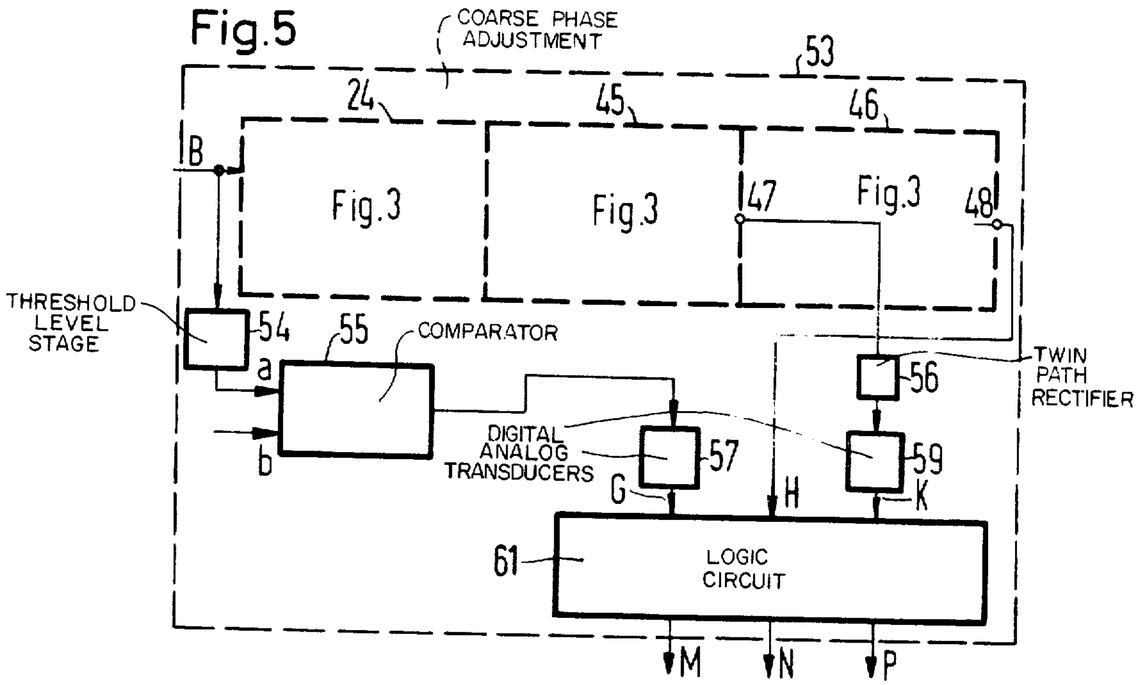
FIG. 5 is a block schematic diagram of a preferred embodiment of circuitry for the coarse adjustment of the carrier phase.

FIG. 4 shows several signals which are comparable to the signal B illustrated in FIG. 2 and which are supplied over the output of the demodulator 16 shown in FIG. 1. The signals B0 or B90 or B180 or B270 concern a carrier phase error of 0° or 90° or 180° or 270°. FIG. 5 and the table hereinbelow show how the carrier phase error F can be identified by the binary signals G, H, K, M, N, P:

TABLE

| F | G | H | K | M | N | P |
|---|---|---|---|---|---|---|
| 1st Quadrant | | | | | | |
| O ≤ F<90 | | | (O<Diff<0.735) | 0 | 0 | 0 |
| (B0) | 1 | 1 | 1 | | | |
| 2nd Quadrant | | | (Dif>0.735) | | | |
| 90 ≤ F<180 | 1 | 1 | 0 | | | |
| (B90) | | | | 1 | 0 | 0 |
| | | | (0<Diff<0.735) | | | |
| | 0 | 0 | 1 | | | |
| 3rd Quadrant | | | | | | |
| 180 ≤ F<270 | | | (0<Diff<0.735) | | | |
| (B180) | 0 | 1 | 1 | 0 | 1 | 0 |
| 4th Quadrant | | | (Diff>0.735) | | | |
| | 0 | 1 | 0 | | | |
| 270 ≤ F<360 | | | (0<Diff<0.735) | 0 | 0 | 1 |
| (B270) | 1 | 1 | 1 | | | |

The first columns of the table relate to the carrier phase error F. The case of the first quadrant occurs if the carrier phase error is equal to or greater than 0°, but smaller than 90°. In the case of the second quadrant the carrier phase error is greater than or equal to 90°, but smaller than 180°. In the case of the third quadrant the carrier phase error is greater than or equal to 180°, but smaller than 270°, and in the case of the fourth quadrant the carrier phase error is greater than or equal to 270°, but smaller than 360°.

The second column of the table relates to signal G which identifies the algebraic sign of the amplitude extremes of the signals B. Hereinafter, the binaries of the signals are called value 1 or value 0. G=1 designates a positive algebraic sign and G=0 a negative algebraic sign. For the case of the first quadrant the signal B0 illustrated in FIG. 4 shows a positive amplitude B01, so that the signal G=1. For the case of the second quadrant the signal B90 shows that the signal B can assume the value 1 or 0 if the positive extreme value B91 or the negative extreme value B902 is considered as first extreme value. For the case of the third quadrant the signal B180 shows that only the negative extreme value B1801 is considered as first extreme value and, thus, G=0. For the case of the fourth quadrant the signal B270 shows that either G=0, if the negative extreme value B2701 is considered as first extreme value, or that G=1 if the positive extreme value B2702 is considered as first extreme value.

The third column of the table concerns the signal H which identifies the algebraic sign of the difference between the extreme values, this difference being equal to the absolute value of the first extreme value minus the absolute value of the second extreme value. In the case of the first quadrant the extreme value B01 is always greater than the extreme value B02, so that the difference Diff is positive and we set H=1. In the case of the second quadrant the extreme value B901 with G=1 is always greater than the subsequent extreme value B903 so that the difference Diff is positive, and we set H=1. With G=1, the extreme value B902 is always smaller than the extreme value B901, so that the difference is negative, and we set H=0. For the case of the third quadrant the extreme value B1801 is always greater than the extreme value B1802, so that the difference is positive and the signal H=1. For the case of the fourth quadrant the extreme value B2701 with G=0 is always greater than the extreme value B2703 so that the difference is positive and the signal H=1. With G=1 the extreme value B2702 is smaller than the extreme value B2701, so that the difference is negative and G=0.

The fourth column of the table refers to signal K and to the absolute value of the difference (Diff) between the extreme values. The absolute value of the difference between the extreme values is identified by means of the difference between extreme values occurring with a 90° carrier phase error to which is associated a numerical value of 0.735. In the case of the first and the third quadrant this absolute value of the difference between extreme values is greater than 0, but smaller than 0.735. In these two cases the value 1 is associated to the signal K. In the case of the second quadrant with G=0 and in the case of the fourth quadrant with G=1 the value 1 is likewise assigned to the signal K. However, in the case of the second quadrant with G=1 and in the case of the fourth quadrant with G=0 the absolute value of the difference is greater than 0.735. In these two cases the value 0 is associated to the signal K.

The table shows that each of the quadrants is characterized by a special binary combination of the signals G, H, and K. For example, the combination G=1, H=1, K=1 indicates that the carrier phase error F lies in the first quadrant. It is conceivable to use the signals G, H, and K directly or without transformation as control signals for the purpose of controlling the carrier phase. However, it is convenient to also derive the signals M, N, and P, plotted in the table, in dependence upon the signals G, H, and K; the values 1 of the signals M, N, and P characterize exactly one quadrant at a time. For example, with M=1 the second quadrant is characterized, with N=1 the third quadrant, and with P=1 the fourth quadrant. The following equations 50 and 51 and 52 show the logic connection between the signals M, N, P and the signals G, H, and K.

$$M = (G + H + \bar{K}) \vee (\bar{G} + \bar{H} + K) \quad (50)$$

$$N = \bar{G} + H + K \quad (51)$$

$$P = (\bar{G} + H + \bar{K}) \vee (G + \bar{H} + K) \quad (52)$$

where the + sign stands for a logical conjunction and v is a logical disjunction.

As soon as, by means of the signals G, H, K, M, N and P, it has been recognized in which quadrant the carrier phase error F lies, steps can be taken to diminish the carrier phase error. In the case of the first quadrant no steps need be taken within the limits of the coarse adjustment. In the case of the second quadrant, the carrier phase is adjusted by the angle −90° within the limit of the coarse adjustment with the signal M=1. In the case of the third quadrant, the carrier phase is adjusted by the angle 180° with the signal N=1, and in the case of the fourth quadrant the carrier phase is adjusted by the angle +90° with the signal P = 1.

FIG. 5 shows a circuit arrangement 53 by which the signals M, N, and P are generated for the coarse adjustment of the carrier phase. The circuit arrangement 53 comprises the rectifiers 24 (described with reference to the FIG. 3), amplitude comparator 45 and the control circuit 46, a threshold-level stage 54, a comparator 55, a twin-path rectifier 56, digital-to-analog transducers 57, 59, and a logic circuit 61.

The signal B is routed to the input of the threshold stage 54, which signal, as shown in FIG. 1, is supplied from the output of the demodulator 16 via the switch 23, when the latter is in the dashed-line operating position. A variant of signal B is illustrated in FIG. 2, and further variants B0, B90, B 180, B270 are shown in FIG. 4. In the threshold stage it is determined if the signal B exceeds a preassigned threshold level, and should this be the case, an analog signal is transmitted to the input 55*a* of the comparator over the output. A 0-Volt signal is fed via the input 55*b*. In the comparator 55 the two signals routed over the inputs 55*a* and 55*b* are compared with one another, and a signal is supplied characterizing the algebraic sign of the extreme values. This signal is fed to the analog-to-digital transducer 57 supplying the signal G.

As has been described with reference to FIG. 3, a signal characterizing the algebraic sign of the difference between the extreme values is supplied over the terminal 48. It is this signal H which is described more fully with reference to the table.

It has likewise been described with reference to FIG. 3 that an analog signal is supplied at the terminal 47 of the differential amplifier 30 characterizing the difference between the extreme values. As shown in FIG. 5, this signal is routed to the twin-path rectifier 56, thereby producing the absolute value of the difference between the extreme values. The output of the twin-path rectifier 56 is connected to the digital-to-analog transducer 59, from the output of which is supplied the signal K already described rather fully with reference to the table.

The signals G, H and K are routed to the logic circuit 61 and the signals M, N and P are derived in accordance with the equations 50, 51 and 52. The logic circuit 61 is made up of logic elements in a manner in itself known so that said logic circuit 61 need not be described in detail because appropriate, conventional logic circuits can be combined to operate in accordance with the foregoing equations.

Figure 6:
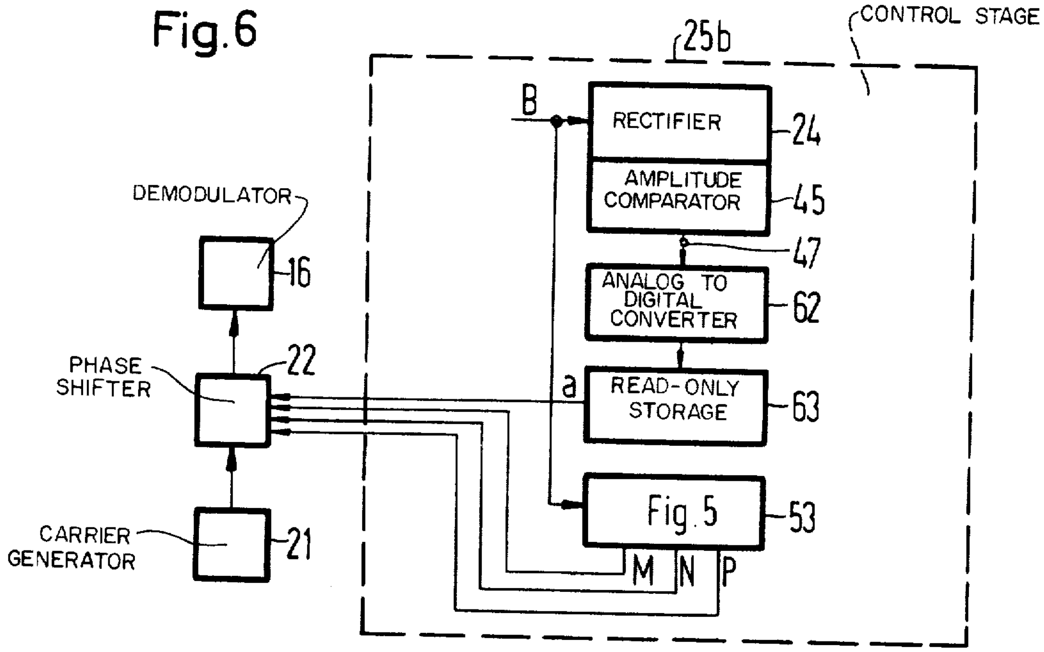
FIG. 6 illustrates in schematic form an alternate preferred embodiment of a control stage by means of which a control signal capable of assuming several values with the aid of a read-only storage is generated.

FIG. 6 illustrates a control stage 25b as an alternate embodiment of the control stage 25 shown in FIG. 1. Moreover, FIG. 6, likewise, shows the demodulator 16 of FIG. 1, the phase shifter 22 and the generator 21.

The control stage 25*b* comprises a rectifier 24, an amplitude comparator 45, a digital-to-analog converter 62, a read-only storage 63, and the circuit arrangement 53 already fully described with reference to FIG. 5. Of one of the signals M, N, P of the circuit arrangement 53 assumes a value 1, the signal 1 is routed to the phase shifter 22, and a coarse adjustment of the carrier phase is brought about. For example, a shifting of the carrier phase by 180° is effected with the signals M=0, N=1, P=0 by means of the phase shifter 22. In this way, the carrier phase error is shifted to the first quadrant. Subsequently, the fine adjustment of the carrier phase is effected by means of the rectifier 24, the amplitude comparator 45, the analog-to-digital converter 62 and the read-only storage 63.

In this process, an analog signal equalling the difference between the amplitude extremes is supplied over terminal 47 shown in FIG. 3. By means of the analog-to-digital converter 62, a digital signal is derived expressing the difference between the amplitude extremes. The digital signal is coupled as an address to the read-only storage over several circuits not shown herein, and over the output 63*a* a digital number is emitted over several circuits not shown herein which indicates by how many degrees the carrier phase shall be adjusted so as to eliminate the carrier phase error. Thus, in the read-only storage 62 the dependence of the carrier phase error upon the difference of the amplitude extremes is stored. The lines outgoing from the output 63*a* and the lines leading from the circuit arrangement 53 to the phase shifter 22 correspond to the line 26 shown in FIG. 1.

Figure 7:
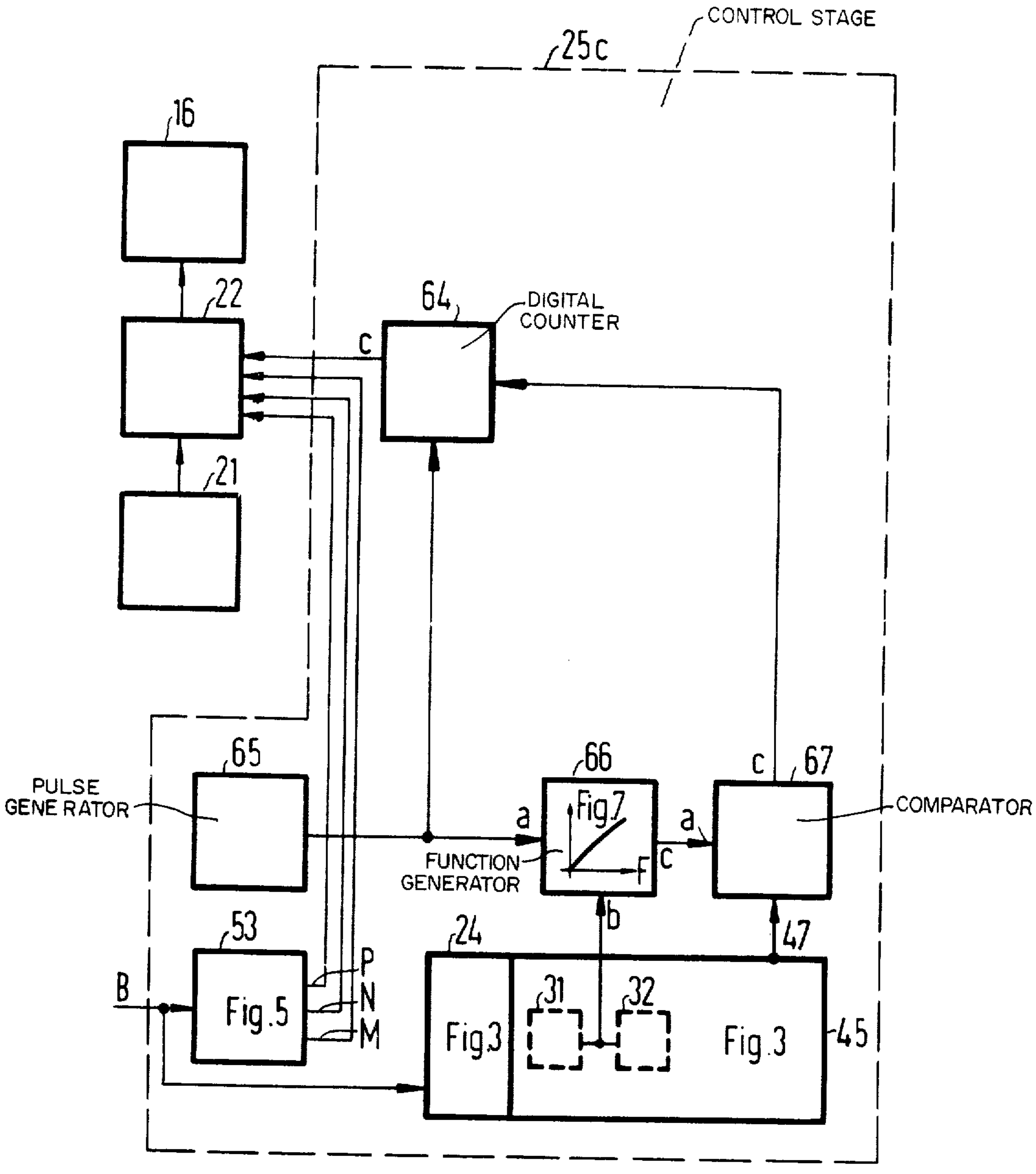
FIG. 7 is a schematic diagram of an alternate preferred embodiment of the control circuit by means of which a control signal capable of assuming several values is generated with the aid of a function generator.

FIG. 7 illustrates a control stage 25*c* as a further embodiment of the control stage 25 shown in FIG. 1. Control stage 25*c* comprises essentially a digital counter 64, a pulse generator 65, a function generator 66, a comparator 67, the circuit arrangement 53, the rectifier 24, and the amplitude comparator 45. As in the case of FIG. 6, a coarse adjustment of the carrier phase is brought about by means of the circuit arrangement 53 and the phase shifter 22. In this way, the carrier phase error can be caused to lie within the first quadrant. Subsequently, the fine adjustement of the carrier phase is carried out.

The pulse generator 65 produces a series of counting pulses, whose pulse frequency is substantially greater than that of the pulses A shown in FIG. 2. The counting pulses are routed to input 66*a*. Function generator 66 produces an analog signal which expresses the carrier phase error F in dependence on the difference between the extreme values.

Figure 8:
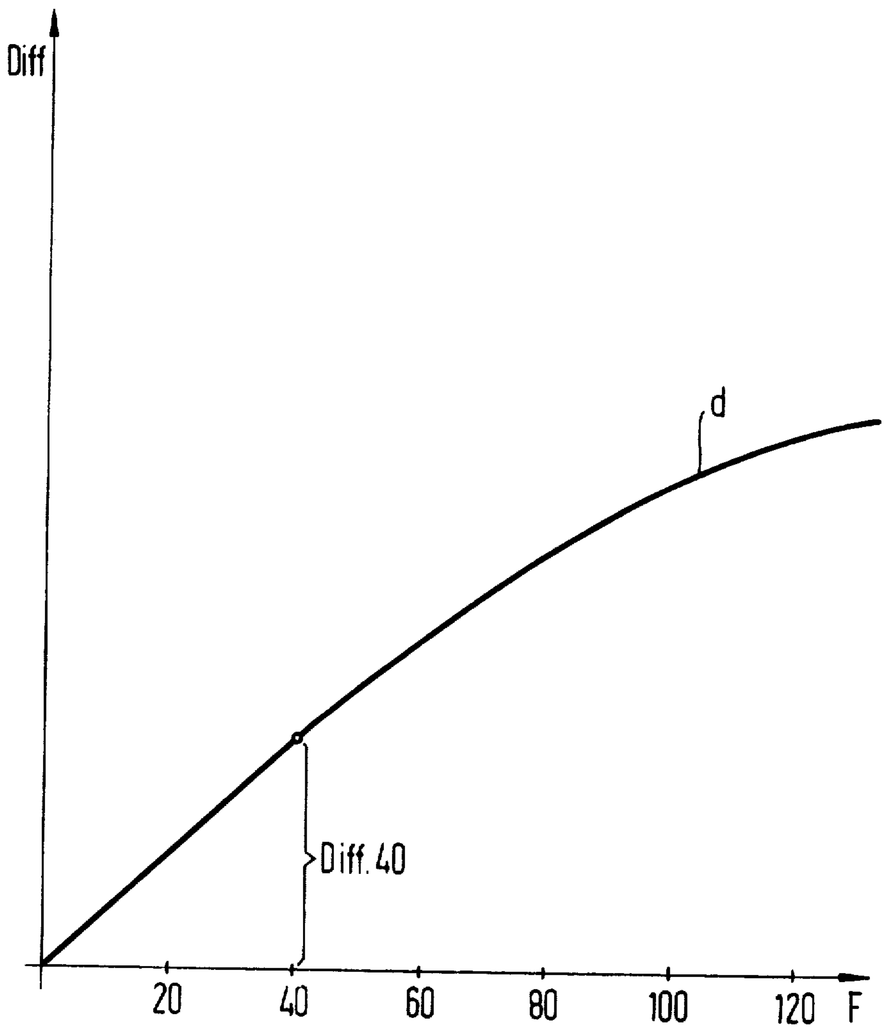
FIG. 8 is a graph illustrating the dependence of the carrier phase error upon the difference of the amplitude extremes.

The diagram shown in FIG. 8 shows this dependence more clearly. The direction of the abscissa refers to the carrier phase error F expressed in units of the counting pulses from pulse generator 65, which are incoming sequentially. The direction of the difference refers to the differnce between the amplitude extremes expressed in the same units, just as they are routed to the comparator 67 over the terminal 47. The curve d shown in FIG. 8 thus shows the amount of the carrier phase error F if a specified difference Diff has been determined. The function generator 66 constantly supplies an analog signal whose amplitude equals the values of the ordinates of the curve d shown in FIG. 8. In the process, the initial point of the coordinates is established by a signal which is coupled to the function generator 66 over the input b. This signal is derived from the output of the threshold circuit 31, likewise, shown in FIG. 3, and triggers the function generator shortly before the switches 38 and 39 shown in FIG. 3 are changed over.

In the comparator 67 the signals are constantly compared with one another over the inputs 67*a* and 67*b*, and if both signals are identical, a trigger signal is transmitted to the digital counter 64 over the output 67*c*. This trigger signal causes the output of the position of the digital counter 64 to the phase shifter 22 and the resetting of the counter to an initial position. If, for example, 40 counting pulses have been emitted from the pulse generator 65 to the function generator 66 and to the digital counter 64, the digital counter 64 will have reached the position 40, and an analog signal is then transmitted over the output 66c whose amplitude equals the value Diff 40 shown in FIG. 8. If, at the same time that the position 40 is reached by the counter, an analog signal is transmitted over the terminal 47, whose amplitude likewise equals the value Diff 40, the comparator 67 will transmit a trigger signal to the digital counter 64 which emits an output corresponding to the position 40 as a digital number to the phase shifter 22 over the output c. The phase shifter 22 then causes an adjustment of the carrier phase by 40 units, thereby eliminating the carrier phase error.

The method and apparatus are described hereinabove in terms of preferred forms of apparatus constructed according to the principles of the invention, and by which apparatus the method of the invention can be performed. It is to be noted, however, that it is contemplated that the described embodiments can be modified or changed while remaining within the scope of the invention, as defined by the appended claims.

I claim:

1. A method for adjusting the phase of the demodulating carrier signal in a receiver of a transmission system for information-bearing amplitude modulated carrier signals, comprising the steps of:
  generating a test signal having two amplitude extremes of equal values with repetitions of the test signal wave form being spaced in time from each other,
  coupling said test signal to a modulator and transmitter for the system for modulating the carrier for transmission, during the period when no information-bearing signals are present at the modulator,
  demodulating said test signal using a carrier,
  producing a control signal having a value dependent on the values of the amplitude extremes of said demodulated test signal and
  changing, responsive to said control signal, the phase of said demodulating carrier signal when the amplitude extreme of said demodulated test signal are unequal in value.

2. The method defined in claim 1 wherein said generating step comprises producing a test signal waveform having a sequence of pulses capable of being represented as an odd time function.

3. The method defined in claim 1 wherein said test signal waveform is a sequence of pulses capable of being represented as even time functions, comprising the additional steps of:
  shifting the phase of said demodulating carrier signal by 90°, upon the production of said control signal and
  readjusting the phase of said demodulating carrier signal back by 90° after said changing step.

4. The method defined in claim 1, comprising the additional step of: adjusting, manually, the period during which the test signal is communicated from the transmitter to the demodulator.

5. The method defined in claim 4 wherein said adjusting step comprises manually adjusting the start of the period when the transmission is carried from the transmitter to the demodulator and wherein the end of the period is determined by a delay element.

6. The method defined in claim 1 wherein said coupling step occurs automatically when no information bearing signals are being communicated to the demodulator.

7. The method defined in claim 6, comprising the additional step of:
  terminating the transmission of said test signal when information bearing signals are being transmitted.

8. The method defined in claim 1 wherein said coupling step occurs only when the phase error between said amplitude modulated carrier signal and said demodulating carrier signal exceeds a predetermined value.

9. The method defined in claim 1 wherein said producing step further comprises producing a control signal capable of assuming two binary values dependent on the algebraic sign of the difference between the amplitude extremes of the demodulated test signal and comprising the additional step of:
  shifting the phase of said demodulating carrier signal positively or negatively in dependence on said two binary values.

10. The method defined in claim 1 wherein said producing step further comprises generating said control signal to have a value depend on to value of the difference between the amplitude extremes of said demodulated test signal.

11. The method defined in claim 1 comprising the additional step of:
  rectifying said demodulated test signal and
  wherein said producing step further comprises generating said control signal to have a value dependent on to the value of the difference between the amplitude extremes of said rectified demodulated test signal.

12. The method defined in claim 1 comprising the additional steps of:
  determining the difference between the amplitude limits of the demodulated test signal and
  inserting a value corresponding to said determined difference as an address to a read-only storage, and
  wherein said producing step further comprises emitting a digital signal from said read-only storage as said control signal, said digital control signal having a value corresponding to the value inserted in said read-only storage.

13. The method defined in claim 11 comprising the additional steps of:
  determining the difference between the amplitude extremes of the demodulated test signal,
  generating, in a function generator, a signal corresponding to said determined difference,
  comparing said generated signal with said determined difference and producing a trigger signal if the result of the comparison is identity,
  counting, in a digital counter, pulses applied thereto at a predetermined rate and
  coupling said trigger signal to said digital counter and causing said counting to stop upon the appearance of said trigger signal at said digital counter, and
  wherein said producing step further comprises deriving said control signal from the counted result of said digital counter.

14. In a transmission system for amplitude modulated carrier signals having a transmitter including means for generating information-bearing signals and a modulator for amplitude modulating a carrier signal with said information-bearing signals for transmission and having a receiver including means for generating a demodulating carrier signal, a demodulator for demodulating signals received from said transmitter using said demodulating carrier signal, means for adjusting the phase of said demodulating carrier signal and terminal equipment for utilizing the received, demodulated information-bearing signals, the improvement comprising:

means for generating a test signal, first switch means having two operating positions, in a first position connecting said means for generating information-bearing signals to said modulator and in a second position connection said means for generating a test signal to said modulator, control circuit means in said receiver coupled to said means for generating a control signal having a value which is a function of the amplitude extremes of said test signal, said control signal being coupled to said adjusting means, when demodulated, said control circuit means having an output connectable to said adjusting means, said adjusting means being operable responsive to said control signal, and second switch means having two operating positions, in a first position connecting an output of said demodulator to said terminal equipment and in a second position connecting an output of said demodulator to said control circuit means.

15. The improved transmission system defined in claim 14 wherein said control circuit comprises:

an amplitude comparator having two storage elements which store, respectively, voltages corresponding to each amplitude extreme of said demodulated test signal and differential amplifier means for producing said control signal from the contents of said two storage elements.

16. The improved transmission system defined in claim 15 wherein said amplitude comparator comprises:

threshold circuit means for receiving said demodulated test signal and for supplying an output signal when the amplitude of said demodulated test signal exceeds a predetermined value and control switching means for periodically erasing said storage elements responsive to the appearance of an output signal from said threshold circuit means.

17. The improved transmission system defined in claim 14 further comprising:

means for executing a coarse adjustment of the phase of said demodulating carrier signal comprising means for supplying a first binary signal, the levels of which indicate the algebraic sign of the amplitude extremes of said demodulated test signal, means for supplying a second binary signal, the levels of which indicate the algebraic sign of the difference between the amplitude extremes and means for supplying a third binary signal, the levels of which indicate the absolute value of the difference between the amplitude extremes and means for coupling said first, second and third binary signals to said adjusting means, said adjusting means being responsive to said first, second and third binary signals to effect a coarse adjustment of the phase of said demodulating carrier signal.

* * * * *